UNITED STATES PATENT OFFICE.

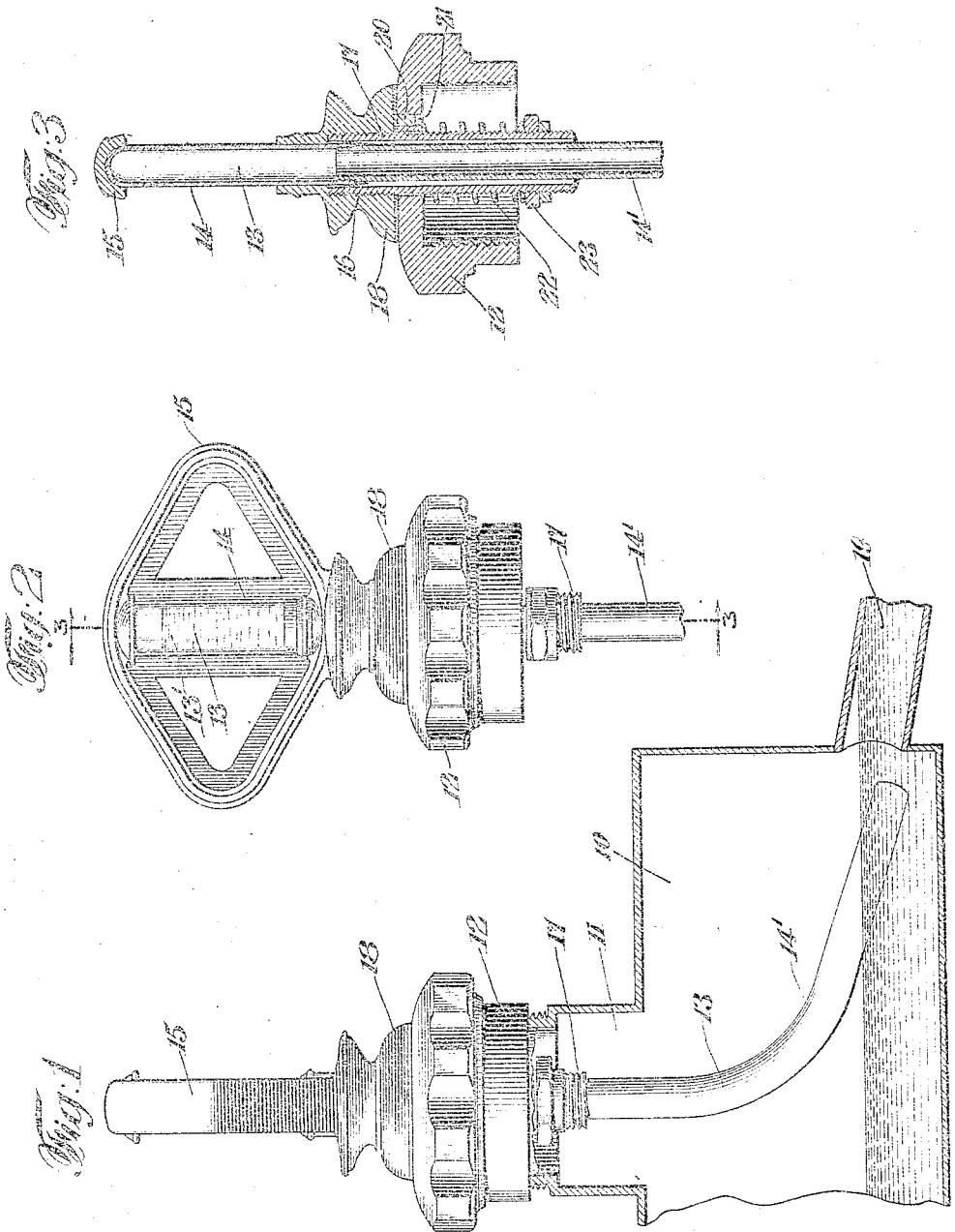

LOUIS V. ARONSON, OF NEWARK, NEW JERSEY.

TEMPERATURE-INDICATING DEVICE FOR COOLING SYSTEMS FOR INTERNAL-COMBUSTION ENGINES.

1,347,317.  Specification of Letters Patent.  Patented July 20, 1920.

Application filed October 17, 1916. Serial No. 126,196.

*To all whom it may concern:*

Be it known that I, LOUIS V. ARONSON, a citizen of the United States, and a resident of Newark, in the county of Essex and State of New Jersey, have invented certain new and useful Improvements in Temperature-Indicating Devices for Cooling Systems for Internal-Combustion Engines, of which the following is a specification.

The invention relates to temperature indicating means for the water cooling systems of internal combustion engines, especially as employed in connection with automobiles, and more particularly to means of this character in which the actual temperature condition of the cooling water is to be indicated. It will be appreciated that in order to reach the cooling water, the heat responsive element must extend well within the tank space of the automobile radiator, and it is the object of the present invention to provide means whereby this may be conveniently and readily accomplished and the exposed end of said element readily accommodated to the particular character of said tank, while at the same time retaining the usual transparent outer indicator portion of said element. In my co-pending application Serial No. 126197 (now U. S. Letters Patent No. 1306396 of June 10, 1919) I have shown and described a similar arrangement; but no claim therein is made to this feature.

In the accompanying drawings which illustrate the invention—

Figure 1 is a side elevation of the improved temperature indicating device, located in the upper portion of an automobile radiator, the latter being shown in section.

Fig. 2 is a front elevation of the temperature indicating device and radiator cap.

Fig. 3 is a vertical section therethrough taken on the lines 3—3, Fig. 2.

Similar characters of reference designate corresponding parts throughout the several views.

Referring to the drawings, 10 designates the radiator, or rather the upper tank portion thereof, which is generally provided with a cylindrical filling opening 11 through which the water of the radiator may be replenished, said opening being normally closed by a suitable cap 12 arranged to be screwed thereon. The cap 12 is designed, furthermore, to carry the temperature indicating device, which, in the form illustrated, consists of a tubular member 13 adapted to retain a suitable liquid 13', for example a solution of a cobalt salt in water, which solution will undergo a change in color over a certain range of temperature and reverting to same when the original temperature is restored. No claim, however, is made to this feature in the present application. The said tubular member 13 consists of two portions; and the outer or indicating portion 14, which is of glass or other transparent material, may be mounted in a suitable protecting frame 15. The said portion 14 is closed at the top and its lower end connects with a portion 14' which is of a flexible material, preferably metal, the same being screwed into the open end of portion 13 and closed at its lower end. The junction is sealed as by surrounding it with a short piece of rubber tubing 16, and about which is located a short length of metal tubing or bushing 17, externally threaded for connection of said temperature responsive member to its frame 15, or rather base 18 thereof. The lower end of bushing 17 is closed to the extension 14' by means of solder or cement so that a rigid and substantial joint is provided. The portion 14' of the tubular member, closed at its lower end, this forming a compound member, is made of such length as to be caused to extend well below the normal water level so as to be at all times submerged in the water of the tank, or to lie directly in the path of the water issuing from the return pipe 19. Said portion, moreover, due to its flexibility, may be accommodated to various types of radiator tanks, and when once properly placed therein, may be conveniently removed and replaced, as hereinafter set forth.

In order to allow of relative motion between said cap and the frame 15 with contained temperature responsive device, as in unscrewing the cap when desiring to replenish the water in the tank, the underface of the enlargement or base 18 of said frame is provided with a downwardly extending pin 20, which is adapted to engage in a suitable socket 21 provided therefor in the top of the cap 12. To secure the two members against rattle and dislodgment, a spring 22 is interposed between the underface of cap 12 and a nut or nuts 23 screwed upon the lower end of the bushing 17. When it is desired to unscrew the cap 12, it is necessary merely to raise the enlargement 18 to disengage its pin 20 from said cap and rotate the latter, whereupon the entire temperature indicator and cap may be removed from the tank 10 and free access had thereto through the filling opening 11. The extending portion of the heat responsive element may then be returned to its proper position in the tank, for example, as shown in Fig. 1 and the cap screwed into place.

I claim:

1. A heat responsive element for insertion through an automobile radiator cap, and consisting of a compound tubular member containing a heat responsive liquid capable of automatically changing its normal color to an abnormal one simultaneously when the normal conditions of the engine become abnormal, the said member having a transparent indicator portion for said liquid projecting above the radiator cap and a continuation thereof of flexible material.

2. A heat responsive element for insertion through an automobile radiator cap, and consisting of a compound tubular member containing a heat responsive liquid capable of automatically changing its normal color to an abnormal one simultaneously when the normal conditions of the engine become abnormal, the said member having a glass indicator portion for said liquid projecting above the radiator cap and a continuation thereof of flexible material.

3. A heat responsive element for insertion through an automobile radiator cap, and consisting of a compound tubular member containing a heat responsive liquid capable of automatically changing its normal color to an abnormal one simultaneously when the normal conditions of the engine become abnormal, the said member having a transparent rigid indicator portion for said liquid projecting above the radiator cap and a continuation thereof adapted to be bent into position to bring its outer end into direct contact with the fluid issuing from the radiator return pipe, and means secured to the other end whereby the said heat responsive element may be attached to the radiator cap.

Signed at Newark, in the county of Essex and State of New Jersey this 13th day of October, A. D. 1916.

LOUIS V. ARONSON.